US011139862B2

United States Patent
Sayana et al.

(10) Patent No.: US 11,139,862 B2
(45) Date of Patent: Oct. 5, 2021

(54) CONFIGURATION OF RATE MATCHING AND INTERFERENCE MEASUREMENT RESOURCES FOR COORDINATED MULTI-POINT TRANSMISSION

(71) Applicant: Samsung Electronics Co., LTD, Suwon-si (KR)

(72) Inventors: Krishna Sayana, San Jose, CA (US); Boon Loong Ng, Dallas, TX (US); Young-Han Nam, Plano, TX (US); Himke van der Velde, Zwolle (NL); Gerardus Johannes Petrus van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/066,379

(22) Filed: Oct. 29, 2013

(65) Prior Publication Data

US 2014/0126496 A1     May 8, 2014

Related U.S. Application Data (60) Provisional application No. 61/722,009, filed on Nov. 2, 2012.

(51) Int. Cl.
    *H04B 7/024*      (2017.01)
    *H04L 5/00*      (2006.01)
    *H04B 7/0417*      (2017.01)

(52) U.S. Cl.
    CPC .......... *H04B 7/024* (2013.01); *H04L 5/0048* (2013.01); *H04B 7/0417* (2013.01); *H04L 5/0091* (2013.01)

(58) Field of Classification Search
None
See application file for complete search history.

(56) References Cited

U.S. PATENT DOCUMENTS

2011/0317657 A1* 12/2011 Chmiel ............... H04W 72/048
    370/331
2012/0076106 A1* 3/2012 Bhattad ................. H04L 5/0035
    370/330

(Continued)

FOREIGN PATENT DOCUMENTS

WO    WO/2013/138989    * 3/2012  ............ H04W 72/12
WO    WO 2012/081881 A2    6/2012

(Continued)

OTHER PUBLICATIONS

International Search Report dated Feb. 10, 2014 in connection with International Patent Application No. PCT/KR2013/009899, 3 pages.

(Continued)

*Primary Examiner* — Jeffrey M Rutkowski
*Assistant Examiner* — Ning Li (57) ABSTRACT

A method and an apparatus indicate and identify a ZP-CSI-RS configuration. The method for identifying includes identifying a DCI format and the ZP-CSI-RS configuration in response to receiving one or more control messages where a first set of ZP-CSI-RS configuration or configurations are configured to be used for DCI Format 1A and a second set of ZP-CSI-RS configuration or configurations are configured to be used for DCI Format 2D or 2C. The method also includes identifying a PDSCH rate matching based on the identified ZP-CSI-RS configuration. The method for indicating includes transmitting a dynamic signaling control message comprising an indication of a DCI format. The method also includes transmitting transmit a higher layer signaling control message comprising an indication of the ZP-CSI-RS configuration or configurations.

16 Claims, 6 Drawing Sheets

(56) References Cited

U.S. PATENT DOCUMENTS

| | | | |
|---|---|---|---|
| 2012/0113917 A1* | 5/2012 | Gaal | H04L 5/1438 370/329 |
| 2012/0201163 A1* | 8/2012 | Jongren | H04W 24/10 370/252 |
| 2012/0236814 A1* | 9/2012 | Nishio et al. | 370/329 |
| 2012/0275400 A1 | 11/2012 | Chen et al. | |
| 2013/0039291 A1* | 2/2013 | Blankenship | H04L 5/001 370/329 |
| 2013/0039332 A1* | 2/2013 | Nazar et al. | 370/330 |
| 2013/0089040 A1* | 4/2013 | Tabet | H04L 5/0073 370/329 |
| 2013/0114428 A1* | 5/2013 | Koivisto | H04B 7/024 370/252 |
| 2013/0176952 A1* | 7/2013 | Shin | H04L 5/001 370/329 |
| 2013/0194931 A1* | 8/2013 | Lee | H04L 5/0053 370/241 |
| 2013/0208604 A1* | 8/2013 | Lee | H04W 72/042 370/252 |
| 2013/0208677 A1* | 8/2013 | Lee | H04W 24/10 370/329 |
| 2013/0301548 A1* | 11/2013 | Etemad | H04W 76/048 370/329 |
| 2013/0336150 A1* | 12/2013 | Abe et al. | 370/252 |
| 2013/0343313 A1* | 12/2013 | Takeda | H04L 5/001 370/329 |
| 2013/0343317 A1* | 12/2013 | Etemad et al. | 370/329 |
| 2014/0036806 A1* | 2/2014 | Chen | H04W 72/0406 370/329 |
| 2014/0036849 A1* | 2/2014 | Ribeiro et al. | 370/329 |
| 2014/0092827 A1* | 4/2014 | Jongren | H04L 25/0222 370/329 |
| 2014/0092829 A1* | 4/2014 | Han | H04L 5/0053 370/329 |
| 2014/0219115 A1* | 8/2014 | Etemad | H04W 28/12 370/252 |
| 2014/0233663 A1* | 8/2014 | Kang | H04L 27/2649 375/260 |
| 2015/0003352 A1* | 1/2015 | Seo | H04B 7/08 370/329 |
| 2015/0023265 A1 | 1/2015 | Park et al. | |
| 2015/0049621 A1* | 2/2015 | Liu | H04L 5/0048 370/252 |
| 2015/0131604 A1* | 5/2015 | Hammarwall | H04L 1/0026 370/330 |
| 2015/0208392 A1* | 7/2015 | Park | H04B 7/024 370/329 |
| 2015/0215905 A1* | 7/2015 | Park | H04B 7/0473 370/329 |
| 2015/0223208 A1* | 8/2015 | Park | H04L 5/001 370/329 |
| 2015/0282126 A1* | 10/2015 | Park | H04L 5/0091 370/329 |
| 2017/0303252 A1* | 10/2017 | Park | H04L 5/0035 |

FOREIGN PATENT DOCUMENTS

| | | | | |
|---|---|---|---|---|
| WO | WO 2012/108805 A1 | 8/2012 | | |
| WO | WO/2013/058502 | * 10/2012 | | H04L 27/26 |
| WO | 2013119092 A1 | 8/2013 | | |

OTHER PUBLICATIONS

Written Opinion of International Searching Authority dated Feb. 10, 2014 in connection with International Patent Application No. PCT/KR2013/009899, 4 pages.

3GPP TSG-RAN WG1 #68; "Reference Signal Design for Interference Measurement"; Feb. 6-10, 2012; Marvell; Dresden, Germany; 2 pages.

3GPP TSG RAN WG1 #70bis; "PDSCH RE mapping and quasi-collocation signaling for CoMP"; Oct. 8-12, 2012; ETRI; San Diego, USA; 4 pages.

Notification of Reason for Rejection regarding Japanese Patent Application No. 2015-540607, dated Sep. 15, 2017, 8 pages.

Samsung, "RRC Parameters for Downlink CoMP", 3GPP TSG RAN WG1 #70bis, R1-124669, Oct. 8-12, 2012, 5 pages.

Huawei et al., "Way forward on remaining issues of DCI format 1A in TM10", 3GPP TSG RAN WG1 #70bis, R1-124641, Oct. 8-12, 2012, 3 pages.

ZTE, "Downlink control signaling for CoMP", 3GPP TSG RAN WG1 #70bis, R1-124626, Oct. 8-12, 2012, 7 pages.

Foreign Communication from Related Counterpart Application; Chinese Patent Application No. 201380057655.6; Chinese Office Action dated Apr. 28, 2017; 18 pages.

LG Electronics, "Signaling for quasi co-location assumptions and PDSCH rate matching", 3GPP TSG RAN WG1 Meeting #70bis, Oct. 8-12, 2012, 7 pages, R1-124316.

Office Action dated Jun. 11, 2018 in connection with Japanese Patent Application No. 2015-540607.

\* cited by examiner

CONFIGURATION OF RATE MATCHING AND INTERFERENCE MEASUREMENT RESOURCES FOR COORDINATED MULTI-POINT TRANSMISSION

CROSS-REFERENCE TO RELATED APPLICATION(S) AND CLAIM OF PRIORITY

The present application claims priority to U.S. Provisional Patent Application Ser. No. 61/722,009, filed Nov. 2, 2012, entitled "CONFIGURATION OF RATE MATCHING AND INTERFERENCE MEASUREMENT RESOURCES FOR COORDINATED MULTI-POINT TRANSMISSION". The content of the above-identified patent document is incorporated herein by reference.

TECHNICAL FIELD

The present application relates generally to wireless communication systems and, more specifically, to configuration of rate matching and interference measurement resources for coordinated multipoint (CoMP) transmissions.

BACKGROUND

CoMP technology has been standardized to allow the user equipment (UE) to receive signals from multiple transmission points (TPs) in different usage scenarios. The different scenarios include: 1) a homogeneous network with intra-site CoMP, 2) a homogeneous network with high transmit (Tx) power remote radio heads (RRHs), 3) a heterogeneous network with low-power RRHs within the macro cell coverage where the transmission/reception points created by the RRHs have different cell identifiers (IDs) from the macro cell, and 4) a heterogeneous network with low power RRHs within the macro cell coverage where the transmission/reception points created by the RRHs have the same cell IDs as the macro cell. The CoMP communication schemes that have been identified as the focus for standardization are joint transmission (JT); dynamic point selection (DPS), including dynamic point blanking; and coordinated scheduling/beamforming, including dynamic point blanking. Further description of the CoMP usage scenarios is included in 3GPP TS 36.819, which is expressly incorporated by reference herein.

Accordingly, there is a need for improved configurations in CoMP and methods and apparatuses for indicating and identifying such CoMP configurations.

SUMMARY

Embodiments of the present disclosure provide methods and apparatuses for configuration of rate matching and interference measurement resources for wireless communication.

In one exemplary embodiment, a method for identifying a zero power (ZP)-channel state information (CSI) reference signal (RS) configuration is provided. The method includes identifying a downlink control information (DCI) format and the ZP-CSI-RS configuration in response to receiving one or more control messages where a first set of ZP-CSI-RS configuration or configurations are configured to be used for DCI Format 1A and a second set of ZP-CSI-RS configuration or configurations are configured to be used for DCI Format 2D or 2C. The method also includes identifying a PDSCH rate matching based on the identified ZP-CSI-RS configuration.

In another embodiment, a method for indicating a ZP-CSI-RS configuration is provided. The method includes transmitting a dynamic signaling control message comprising an indication of a DCI format. The method also includes transmitting a higher layer signaling control message comprising an indication of the ZP-CSI-RS configuration or configurations. A first set of ZP-CSI-RS configuration or configurations are configured to be used for DCI Format 1A and a second set of ZP-CSI-RS configuration or configurations are configured to be used for DCI Format 2D or 2C.

In yet another embodiment, an apparatus capable of identifying a ZP-CSI-RS configuration is provided. The apparatus includes a receiver configured to receive one or more control messages and a controller. The controller is configured identify a DCI format and the ZP-CSI-RS configuration where a first set of ZP-CSI-RS configuration or configurations are configured to be used for DCI Format 1A and a second set of ZP-CSI-RS configuration or configurations are configured to be used for DCI Format 2D or 2C. The controller is also configured to identify a PDSCH rate matching based on the identified ZP-CSI-RS configuration.

In yet another embodiment, an apparatus capable of indicating a ZP-CSI-RS configuration is provided. The apparatus includes a transmitter and a controller. The transmitter is configured to transmit a control message comprising an indication of a DCI format and transmit a higher layer signaling control message comprising an indication of the ZP-CSI-RS configuration or configurations. A first set of ZP-CSI-RS configuration or configurations are configured to be used for DCI Format 1A and a second set of ZP-CSI-RS configuration or configurations are configured to be used for DCI Format 2D.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following standards documents are incorporated by reference herein: 1) 3GPP TS 36.211 v10.1.0, "E-UTRA, Physical channels and modulation;" 2) 3GPP TS 36.212 v10.1.0, "E-UTRA, Multiplexing and Channel coding;" 3) 3GPP TS 36.213 v10.1.0, "E-UTRA, Physical Layer Procedures;" 4) RP-111365 Coordinated Multi-Point Operation for LTE WID; and 5) 3GPP TR 36.819 V11.0.0 (2011-09).

Figure 1:
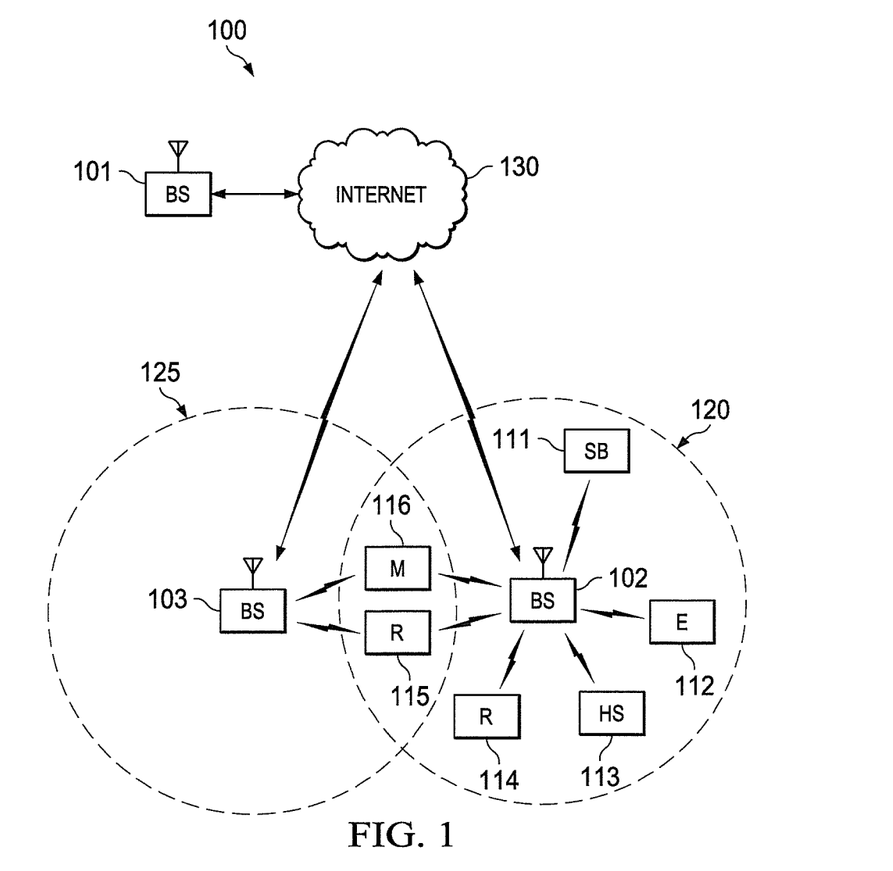
FIG. 1 illustrates an exemplary wireless system which transmits messages in accordance with an illustrative embodiment of the present disclosure.
Figure 2:
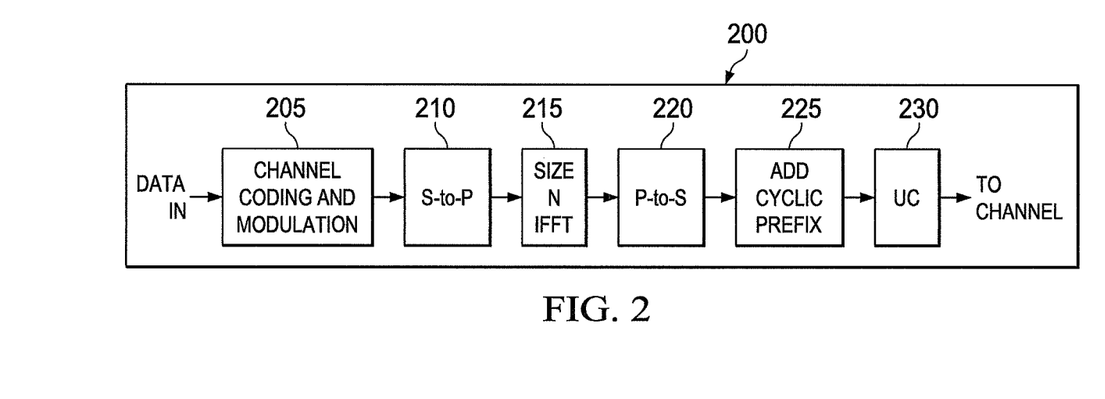
FIG. 2 illustrates a high-level diagram of an orthogonal frequency division multiple access transmit path in accordance with an illustrative embodiment of the present disclosure.
Figure 3:
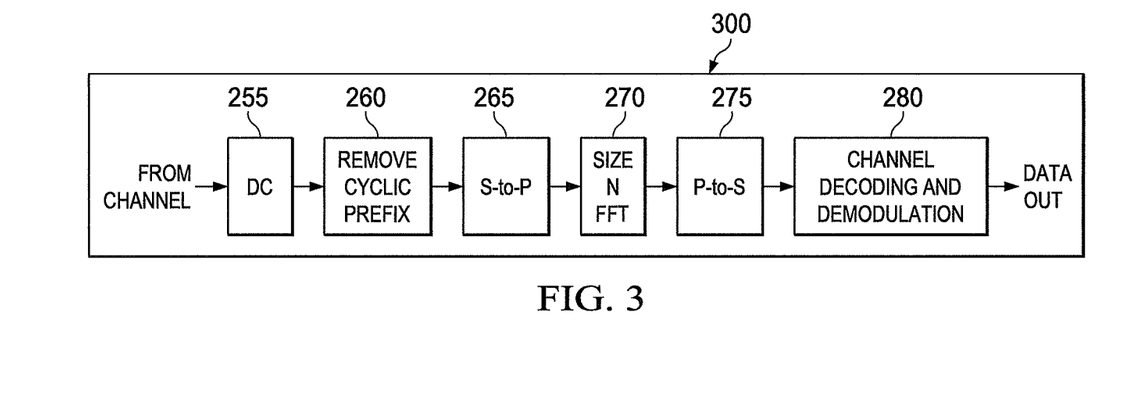
FIG. 3 illustrates a high-level diagram of an orthogonal frequency division multiple access receive path in accordance with an illustrative embodiment of the present disclosure.

FIGS. 1-3 below describe various embodiments implemented in wireless communications systems and with the use of OFDM or OFDMA communication techniques. The description of FIGS. 1-3 is not meant to imply physical or architectural limitations to the manner in which different embodiments may be implemented. Different embodiments of the present disclosure may be implemented in any suitably arranged communications system.

FIG. 1 illustrates exemplary wireless system 100, which transmits messages according to the principles of the present disclosure. In the illustrated embodiment, wireless system 100 includes transmission points (e.g., an Evolved Node B (eNB), Node B), such as base station (BS) 101, base station (BS) 102, base station (BS) 103, and other similar base stations or relay stations (not shown). Base station 101 is in communication with base station 102 and base station 103. Base station 101 is also in communication with network 130 or a similar IP-based system (not shown).

Base station 102 provides wireless broadband access (via base station 101) to network 130 to a first plurality of user equipment (e.g., mobile phone, mobile station, subscriber station) within coverage area 120 of base station 102. The first plurality of user equipment includes user equipment 111, which may be located in a small business (SB); user equipment 112, which may be located in an enterprise (E); user equipment 113, which may be located in a WiFi hotspot (HS); user equipment 114, which may be located in a first residence (R); user equipment 115, which may be located in a second residence (R); and user equipment 116, which may be a mobile device (M), such as a cell phone, a wireless laptop, a wireless PDA, or the like.

Base station 103 provides wireless broadband access (via base station 101) to network 130 to a second plurality of user equipment within coverage area 125 of base station 103. The second plurality of user equipment includes user equipment 115 and user equipment 116. In an exemplary embodiment, base stations 101-103 may communicate with each other and with user equipment 111-116 using OFDM or OFDMA techniques.

While only six user equipment are depicted in FIG. 1, it is understood that wireless system 100 may provide wireless broadband access to additional user equipment. It is noted that user equipment 115 and user equipment 116 are located on the edges of both coverage area 120 and coverage area 125. User equipment 115 and user equipment 116 each communicate with both base station 102 and base station 103 and may be said to be operating in handoff mode, as known to those of skill in the art.

User equipment 111-116 may access voice, data, video, video conferencing, and/or other broadband services via network 130. In an exemplary embodiment, one or more of user equipment 111-116 may be associated with an access point (AP) of a WiFi WLAN. User equipment 116 may be any of a number of mobile devices, including a wireless-enabled laptop computer, personal data assistant, notebook, handheld device, or other wireless-enabled device. User equipment 114 and 115 may be, for example, a wireless-enabled personal computer (PC), a laptop computer, a gateway, or another device.

FIG. 2 is a high-level diagram of transmit path circuitry 200. For example, the transmit path circuitry 200 may be used for an orthogonal frequency division multiple access (OFDMA) communication. FIG. 3 is a high-level diagram of receive path circuitry 300. For example, the receive path circuitry 300 may be used for an orthogonal frequency division multiple access (OFDMA) communication. In FIGS. 2 and 3, for downlink communication, the transmit path circuitry 200 may be implemented in base station (BS) 102 or a relay station, and the receive path circuitry 300 may be implemented in a user equipment (e.g. user equipment 116 of FIG. 1). In other examples, for uplink communication, the receive path circuitry 300 may be implemented in a base station (e.g. base station 102 of FIG. 1) or a relay station, and the transmit path circuitry 200 may be implemented in a user equipment (e.g. user equipment 116 of FIG. 1).

Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path circuitry 300 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2 and 3 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path circuitry 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel, and reverse operations to those at BS 102 are performed. Down-converter 255 down-converts the received signal to baseband frequency, and remove cyclic prefix block 260 removes the cyclic prefix to produce the serial time-domain baseband signal. Serial-to-parallel block 265 converts the time-domain baseband signal to parallel time-domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to base stations 101-103 and may implement a receive path corresponding to the architecture for receiving in the downlink from base stations 101-103.

Figure 4:
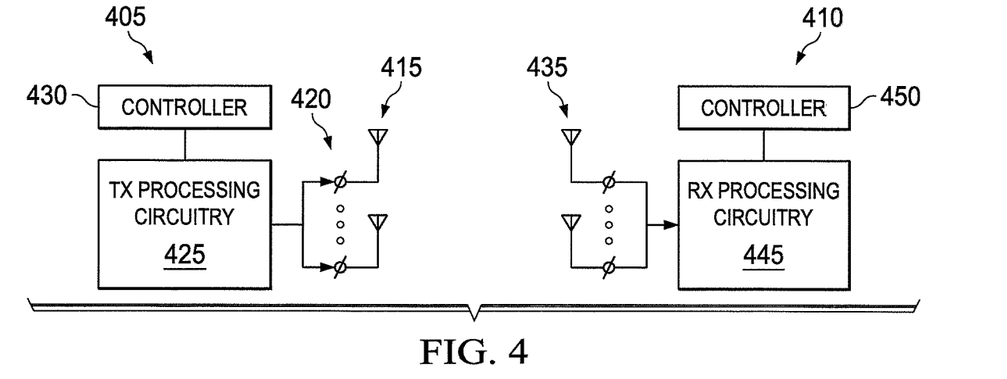
FIG. 4 illustrates a block diagram of a transmitter and a receiver in a wireless communication system that may be used to implement various embodiments of the present disclosure.

FIG. 4 illustrates a block diagram of a transmitter 405 and a receiver 410 in a wireless communication system that may be used to implement various embodiments of the present disclosure. In this illustrative example, the transmitter 405 and the receiver 410 are devices at a communication point in a wireless communication system, such as, for example, wireless system 100 in FIG. 1. In some embodiments, the transmitter 405 or the receiver 410 may be a network entity, such as a base station, e.g., an evolved node B (eNB), a remote-radio head, a relay station, an underlay base station; a gateway (GW); or a base station controller (BSC). In other embodiments, the transmitter 405 or the receiver 410 may be a UE (e.g., mobile station, subscriber station, etc.). In one example, the transmitter 405 or the receiver 410 is an example of one embodiment of the UE 116 in FIG. 1. In another example, the transmitter 405 or the receiver 410 is an example of one embodiment of the base station 102 in FIG. 1.

The transmitter 405 comprises antenna(s) 415, phase shifters 420, Tx processing circuitry 425, and controller 430. The transmitter 405 receives analog or digital signals from outgoing baseband data. Transmitter 405 encodes, multiplexes, and/or digitizes the outgoing baseband data to produce a processed RF signal that is sent and/or transmitted via transmitter 405. For example, the Tx processing circuitry 425 may implement a transmit path that is analogous to the transmit processing circuitry 200 in FIG. 2. Transmitter 405 may also perform spatial multiplexing via layer mapping to different antennas in antenna(s) 415 to transmit signals in multiple different beams. The controller 430 controls the overall operation of transmitter 405. In one such operation, controller 430 controls the transmission of signals by the transmitter 405 in accordance with well-known principles.

Receiver 410 receives from antenna(s) 435 an incoming RF signal or signals transmitted by one or more transmission points, such as base stations, relay stations, remote radio heads, UEs, etc. Receiver 410 includes Rx processing circuitry 445 that processes the received signal(s) to identify the information transmitted by the transmission point(s). For example, the Rx processing circuitry 445 may down-convert the incoming RF signal(s) to produce an intermediate frequency (IF) or a baseband signal by channel estimating, demodulating, stream separating, filtering, decoding, and/or digitizing the received signal(s). For example, the Rx processing circuitry 445 may implement a receive path that is analogous to the receive processing circuitry 300 in FIG. 3. The controller 450 controls the overall operation of the receiver 410. In one such operation, the controller 450 controls the reception of signals by the receiver 410 in accordance with well-known principles.

In various embodiments, the transmitter 405 is located within a TP, and the receiver is located within a UE in a CoMP communication system. For example, in the CoMP communication, multiple TPs may include transmitters similar to the transmitter 405 that transmits to the UE. The multiple TPs may be any combination of base stations (e.g., eNB, macro base stations, etc.), RRHs, and/or underlay base stations (e.g., micro base stations, relay stations, etc.).

The illustration of transmitter 405 and receiver 410 illustrated in FIG. 4 is for the purposes of illustrating one embodiment in which embodiments of the present disclosure may be implemented. Other embodiments of the transmitter 405 and the receiver 410 may be used without departing from the scope of this disclosure. For example, the transmitter 405 may be located in a communication node (e.g., BS, UE, RS, and RRH) that also includes a receiver, such as receiver 410. Similarly, the receiver 410 may be located in a communication node (e.g., BS, UE, RS, and RRH) that also includes a transmitter, such as transmitter 405. Antennas in the Tx and Rx antenna arrays in this communication node may overlap or be the same antenna arrays used for transmission and reception via one or more antenna switching mechanisms.

Figure 5:
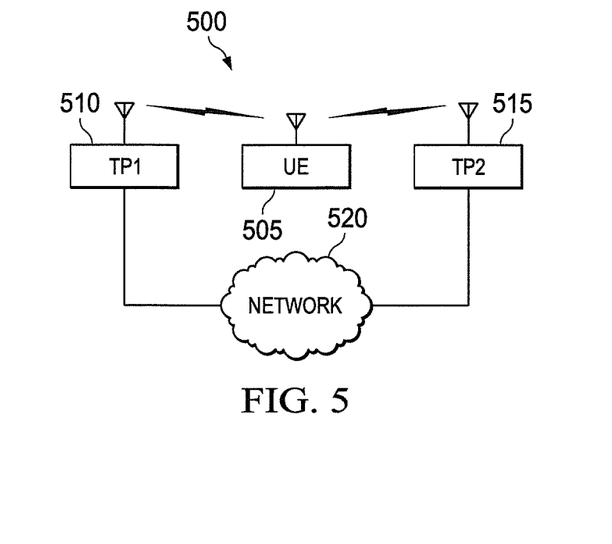
FIG. 5 illustrates a block diagram of a CoMP communication system in which various embodiments of the present disclosure may be implemented.

FIG. 5 illustrates a block diagram of a CoMP communication system 500 in accordance with various embodiments of the present disclosure. In this illustrative example, the CoMP communication system 500 includes a UE 505 and two TPs 510 and 515. For example, the UE 505 may include a receiver and transmitter as illustrated in FIG. 4. The TPs 510 and 515 may also include a receiver and transmitter as illustrated in FIG. 4. The TPs 510 and 515 may be any combination of base stations (e.g., eNB, macro base stations, etc.), RRHs, and/or underlay base stations (e.g., micro base stations, relay stations, etc.). Additionally, other TPs and UEs may be present in the CoMP communication system 500. For example, more than two TPs may communicate with the same UE 505.

The TPs 510 and 515 are connected to a network 520. For example, the TPs 510 and 515 may be connected by a wire line and/or fiber optical network. The network 520 provides connections between the TPs 510 and 515 to provide data and control information for wireless communication between the TPs 510 and 515 and the UE 505. The network 520 performs scheduling for wireless communications in the CoMP communication system 500. For example, the network 520 may include one or more gateways; or base station controllers. In one embodiment, the network 520 may be one embodiment of the network 130 in FIG. 1.

With the different CoMP transmission schemes described in the background above, the network 520 needs to know the channel quality indicator (CQI), precoding matrix indicator (PMI), and rank indicator (RI) supported by the UE to optimize scheduling. The individual CoMP scheme performance may also be characterized by other parameters, such as the TPs used in the CoMP scheme; precoding applied at each of the one or more transmitting TPs; the TPs that are blanked or not transmitting; and the interference measurement resource that may be configured for measurement of individual CQIs.

A channel state information (CSI) reference signal (RS) enables channel measurements by a UE. In Release-10 LTE, a UE specific CSI-RS configuration includes: 1) a non-zero power (NZP) CSI-RS resource; and 2) one or more zero-power CSI-RS resources. Typically, the non-zero power CSI-RS resource corresponds to the antenna elements/ports of the serving cell. Zero-power (ZP) CSI-RS, also commonly referred to as muted CSI-RS, are used to protect the CSI-RS resources of another cell, and a UE is expected to rate match (skip for decoding/demodulation) around these resources. Additional configuration details of the CSI-RS are specified in 3GPP TS 36.211, particularly in sections 6.10.5 and 7.2.5.

To support CoMP transmission, a network needs feedback corresponding to multiple transmission points or cells. As a result, a network can set up multiple CSI-RS resources, each typically corresponding to a TP or CSI process. Further details of CSI-RS resource configurations and the configurable parameters for each CSI-RS resource may include that configuration of multiple non-zero-power CSI-RS resources include at least: AntennaPortsCount, ResourceConfig, SubframeConfig, $P_c$, and a Parameter X to derive scrambling initialization $c_{init}=2^{10} \cdot (7 \cdot (n_s+1)+l+1) \cdot (2 \cdot X+1)+2 \cdot X+N_{CP}$. X ranges from 0 to 503 and can be interpreted as virtual cell id. In Release 10, X is the PCI of the serving cell. These parameters are configured per CSI-RS resource. Some parameters may be configured per CSI-RS port considering the decision of supporting coherent joint transmission by the aggregate CSI feedback corresponding to multiple TPs in one CSI-RS resource. While the CSI-RS resources capture channels of individual TPs, the interference measurement also depends on the CoMP scheme. In Releases 8-10, a single interference measurement resource is typically used, which is typically the cell-specific reference signal (CRS) itself. Interference measurement on CRS captures all the interference outside the cell.

For CoMP, one or more interference measurement resources can be defined to capture the interference for a hypothetical CoMP scheme. At least one Interference Measurement Resource (IMR) (also referred to as a CSI-interference measurement (IM) resource or CSI-IM resource) can be configured for a Release-11 UE. A maximum of only one or multiple IMRs may be configured for a Release-11 UE. Each IMR may consist of only REs, which can be configured as Release 10 CSI-RS resources.

For IMR configuration, each IMR may be configured independently with a Release-10 subframeConfig and a Release-10 resourceConfig, where resourceConfig is for 4 REs. All the IMRs configured for one UE may together use only REs which can be configured as a single R10 ZP CSI-RS resource configuration.

For CSI configuration, a Release-11 UE can be configured to report one or more non-PMI-based CQIs per CC. Each non-PMI-based CQI may follow the same configuration as the CoMP CSI, i.e., the non-PMI-Based CQI may be configured by the association of channel part (one NZP CSI-RS resource in CoMP Measurement Set) and interference part (one IMR which occupies a subset of REs configured as Release-10 ZP CSI-RS).

For support of CoMP, new CSI-RS configurations are defined and signaled by higher layers as described herein in accordance with the various embodiments of the present disclosure. In Release-10 and, more specifically, 3GPP TS 36.331, CSI-RS configuration is signaled as follows, where a single non-zero power CSI-RS and its parameters are indicated, while multiple zero-power CSI-RS configurations are indicated using a bitmap. With one or more interference measurement resources supported for CoMP, CSI measurement is based on both a CSI-RS resource and an IMR or CSI-IM resource. As a result, embodiments of the present disclosure define CSI configurations for feedback. In one example, if the UE is configured with multiple IMR resources, each CSI process is defined with an associated (CSI-RS resource, IMR resource) pair.

With CoMP across a set of transmission points, an IMR configuration corresponds to a particular interference hypothesis reflecting interference from some of the transmission points, while other transmission points maybe muted (no transmission). Each TP may have an obligation to mute on different sets of IMR REs corresponding to the UEs in the network. For transmission of PDSCH data, if dynamic point selection is used, a UE may receive transmissions from different TPs at different times. This implies a different PDSCH rate matching pattern depending on the selected TP or TPs for transmission. As a result, the PDSCH muting pattern may be signaled dynamically using a downlink control format that is used for downlink grant. Since IMR REs can also be expressed as a zero-power CSI-RS (ZP-CSI-RS) configuration, embodiments of the present disclosure configure two or more ZP-CSI-RS configurations by higher layer signaling and select between them dynamically. For a new transmission mode defined in Release-11 (Transmission mode 10), a modified DCI format 2D/2C is provided for this purpose. Embodiments of the present disclosure address and provide configuration and indication of rate matching behavior when PDSCH is transmitted with DCI format 1A.

Embodiments of the present disclosure provide muting and ZP-CSI-RS configurations. If new reference symbols are defined in new LTE specifications, then this creates backward compatibility issues for legacy UEs since the legacy UEs may not know to rate match around the REs corresponding to the zero power CSI-RS. For this purpose, ZP-CSI-RS are defined in Release-10 to ensure forward compatibility. In other words, reference symbols defined in a future release that can be configured as zero-power CSI-RS will provide backward compatibility for legacy UEs. Embodiments of the present disclosure provide several embodiments on how to define IMR resources in the new LTE specification so that they behave in this manner. As described above, one or more IMR resources can be configured for a user.

At a high level, embodiments of the present disclosure provide the following rule to provide backward compatibility. Rule 1 (for Backward Compatibility): "All the IMRs configured for one UE shall together use only REs which can be configured as a single R10 ZP CSI-RS resource configuration." Further, it is desirable to be able to configure individual IMRs differently with respect to at least the following parameters, as long as they conform to Rule 1. Table 1 illustrates IMR configuration parameters.

TABLE 1

| ResourceConfig | CSI reference signal configuration as defined in table 6.10.5.2-1 and 6.10.5.2-2 of TS 36.211 for 4 REs. |
|---|---|
| SubframeConfig | $I_{CSI-RS}$ as defined in table 6.10.5.3-1 of TS 36.211. |

A ZP-CSI-RS configuration is a 16 bit bitmap. For each bit set to one in the 16-bit bitmap ZP-CSI-RS configured by higher layers, the UE shall assume zero transmission power for the resource elements corresponding to the four CSI reference signal column in Tables 6.10.5.2-1 and 6.10.5.2-2 of 3GPP TS 36.211 v11.0.0, which are expressly incorporated by reference herein, for normal and extended cyclic prefix, respectively, except for resource elements that overlap with those for which the UE shall assume non-zero transmission power CSI-RS as configured by higher layers. The most significant bit corresponds to the lowest CSI reference signal configuration index, and subsequent bits in the bitmap correspond to configurations with indices in increasing order. As a result, a single ZP-CSI-RS bitmap corresponds to multiple (e.g., 4Tx) CSI-RS configurations transmitted with zero power, but with the restriction that they have the same value of $I_{CSI-RS}$. The $I_{CSI-RS}$ is an index that maps to a subframe periodicity and subframe offset as discussed in greater detail below. Subframes containing CSI reference signals satisfy $(10n_f + \lfloor n_s/2 \rfloor - \Delta_{CSI-RS}) \bmod T_{CSI-RS} = 0$.

Figure 6:
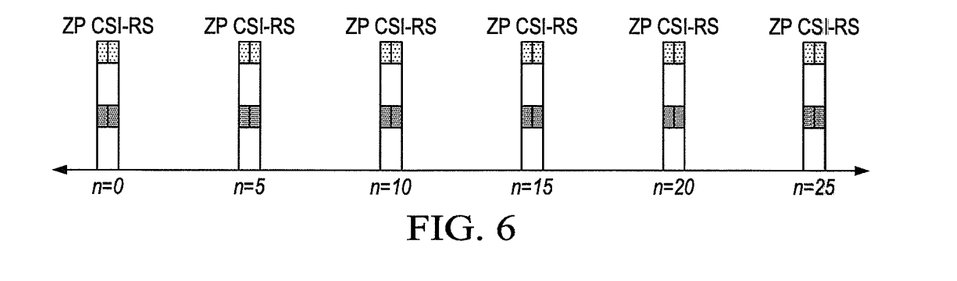
FIG. 6 illustrates an example ZP-CSI-RS configuration in accordance with various embodiments of the present disclosure.

FIG. 6 illustrates an example ZP-CSI-RS configuration in accordance with various embodiments of the present disclosure. In this illustrative example, for convenience of representation, the whole subframe is not shown, and different shading and location in the vertical grid are used to represent each one of the 16 possible CSI-RS reference signal configurations in a subframe. In this example, two CSI-RS configurations are used. Since the periodicity is 5 and the offset is zero (n is the subframe indexing), the $I_{CSI-RS}=0$.

Figure 7:
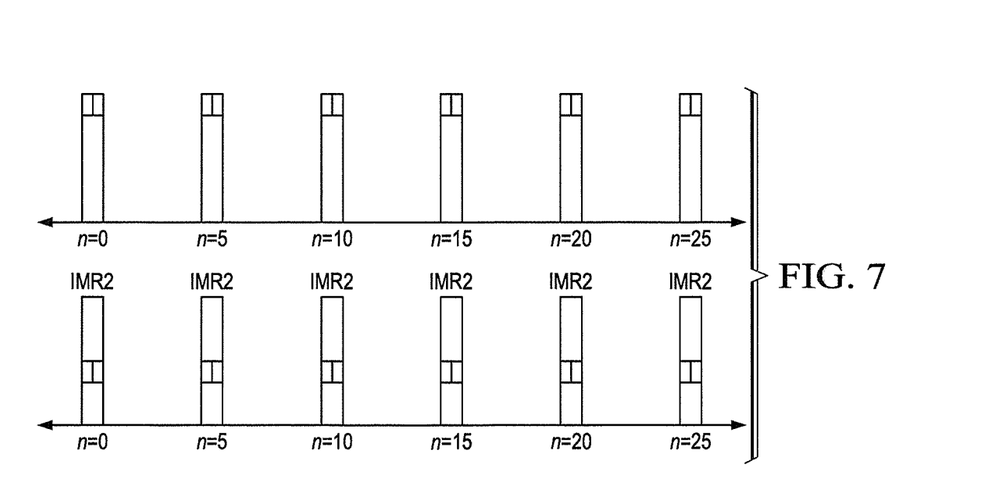
FIGS. 7-9 illustrate examples of IMR configurations that satisfy the ZP-CSI-RS configuration in accordance with various embodiments of the present disclosure.
Figure 8:
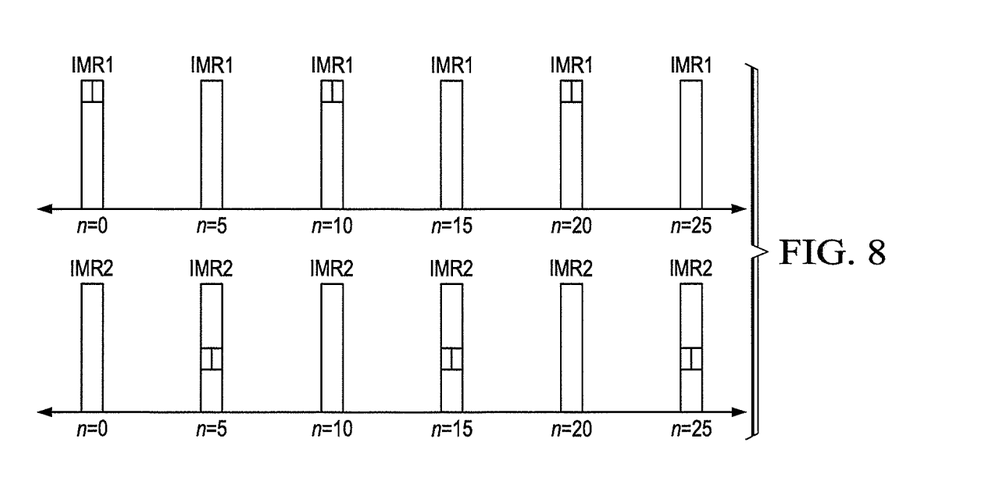
Figure 9:
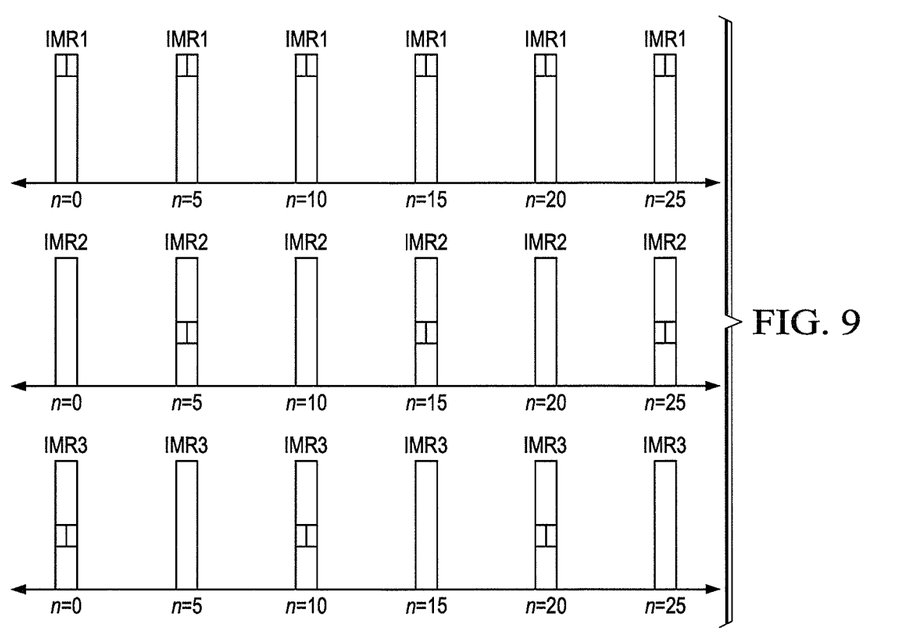

FIGS. 7-9 illustrate example IMR configurations that satisfy the above ZP-CSI-RS configuration in accordance with various embodiments of the present disclosure. FIG. 7 illustrates one example of compatible IMR configurations where the first IMR period (Np1) is 5, the first IMR offset (Noff1) is 0, the second IMR period (Np2) is 5, and the second IMR offset (Noff2) is 0. FIG. 8 illustrates another example of a compatible IMR configuration where Np1 is 10, Noff1 is 0, Np2 is 10, and Noff2 is 5. FIG. 9 illustrates a third example of a compatible IMR configuration where Np1 is 5, Noff1 is 0, Np2 is 10, Noff2 is 5, Np3=10, and Noff3=0. As illustrated in FIGS. 6-9, each IMR is configured with one of the CSI-RS configurations with zero power; each IMR period "Np_imr" is a multiple of periodicity of the zero power CSI-RS configuration "Np_zp." (e.g., includes values in the range [Np_zp, 80 ms]); and each IMR offset "Noff_imr" can take values Noff_zp+i.Np_zp, where i=0, ..., (Np_imr/Np_zp)−1, and "Noff_zp" is the subframe offset for ZP-CSI-RS resource.

Accordingly, various embodiments of the present disclosures provide to configure each IMR parameters independently without reference to the ZP-CSI-RS parameters.

In one exemplary embodiment, the present disclosure provides configuration of IMR independently of ZP-CSI-RS configuration using same parameters used for ZP-CSI-RS configuration. The IE IMR-Config is the IMR configuration that E-UTRAN may configure on a serving frequency. In one example, the IMR-Config information elements may be provided according to Table 2 below:

TABLE 2

```
-- ASN1START
IMR-Config-r11 ::=          SEQUENCE {
    imr-Identity-r11            IMR-Identity-r11,
    resourceConfig-r11          INTEGER (0..15),
    subframeConfig-r11          INTEGER (0..154)
}
-- ASN1STOP
```

The IMR-Config field descriptions are provided according to Table 3 below:

TABLE 3

| IMR-Config field descriptions |
|---|
| resourceConfig |
| Parameter: IMR configuration, see TS 36.211 [21, table 6.10.5.2-1 and 6.10.5.2-2] for 4 REs. |
| subframeConfig |
| Parameter: $I_{CSI-RS}$, see TS 36.211 [21, table 6.10.5.3-1]. |

In an exemplary embodiment, when the set of configured IMRs do not correspond to a valid zero-power CSI-RS configuration, then the UE behavior is unspecified.

In an exemplary embodiment, a user device checks if the set of configured IMRs correspond to a valid zero-power CSI-RS configuration. If the set of configured IMRs do not correspond to a valid zero-power CSI-RS configuration, then a new behavior is specified. One example of new behavior is to use rate-matching around the IMR configurations in addition to zero power CSI-RS configurations. Another example of new behavior is that interference measurements are not based on configured IMR, for example, but based on CRS.

In another exemplary embodiment, the present disclosure provides configuration of IMR reusing ZP-CSI-RS configuration using the same parameters used for ZP-CSI-RS configuration. In this embodiment, configuration of one or more parameters of IMR is based on the configured parameter values of zero power CSI-RS configuration.

In one example, it can be shown that the subframe configuration of IMR is given as a function of subframe configuration of zero power CSI-RS, for example, according to Equation 1 below:

$$I_{CSI-RS,IMR} = I_{CSI-RS,ZP} + iT_{CSI-RS,ZP}, i=0,1, \ldots 2(T_{max}/T_{CSI-RS,ZP}-1) \quad \text{(Equation 1)}$$

where $T_{max}$ is the maximum periodicity configurable, which is equal to 80, and $T_{CSI-RS,ZP}$ is the period associated with the zero power CSI-RS configuration as configured in Table 4 below as in 3GPP TS 36.211. $I_{CSI-RS,IMR}$ and $I_{CSI-RS,ZP}$ may be interpreted the same way as $I_{CSI-RS}$ in Table 4 below. $T_{CSI-RS,ZP}$ is interpreted the same way as $T_{CSI-RS}$ in Table 4 below.

TABLE 4

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

The present disclosure derives the proposed mapping using the relationship $I_{CSI-RS}=\Delta_{CSI-RS}+T_{CSI-RS}-5$ between the subframe-config index and the corresponding offset/period. utilizing Equation 2 below:

$$I_{CSI-RS,IMR} = \Delta_{CSI-RS,IMR} + T_{CSI-RS,IMR} - 5 \quad \text{(Equation 2)}$$

$$= (\Delta_{CSI-RS,ZP} + jT_{CSI-RS,ZP}) +$$

$$kT_{CSI-RS,ZP} - 5,$$

$$k \le (T_{max}/T_{CSI-RS,ZP}), j \le k - 1$$

$$= (\Delta_{CSI-RS,ZP} + T_{CSI-RS,ZP} - 5) +$$

$$(k + j - 1)T_{CSI-RS,ZP}$$

$$= I_{CSI-RS,ZP} + \delta T_{CSI-RS,ZP},$$

$$\delta = k + j - 1 \le 2(k - 1) =$$

$$2(T_{mac}/T_{CSI-RS,ZP} - 1)$$

the equation for the subframe configuration of IMR as a function of subframe configuration of zero power CSI-RS can be rewritten as according to Equation 3 below:

$$I_{CSI-RS,IMR}=I_{CSI-RS,ZP}+\delta_{IMR}T_{CSI-RS,ZP},\delta_{IMR}=0,1,\ldots \\ 2(80/T_{CSI-RS,ZP}-1) \quad \text{(Equation 3)}$$

where the maximum range of variable $\delta_{IMR}$ is given by [0,1, . . . 30].

Accordingly, the IE IMR-Config, which is the IMR configuration that E-UTRAN may configure on a serving frequency, may include the IMR-Config information elements according to Table 5 below.

TABLE 5

```
-- ASN1START
IMR-Config-r11 ::=           SEQUENCE {
    imr-Identity-r11             IMR-Identity-r11,
    resourceConfig-r11           INTEGER (0..15),
    subframeoffsetConfig-r11     INTEGER (0..30)
    ...
}
-- ASN1STOP
```

The IMR-Config field descriptions are provided according to Table 6 below.

TABLE 6

IMR-Config field descriptions resourceConfig
Parameter: IMR configuration, see TS 36.211 [21, table 6.10.5.2-1 and 6.10.5.2-2] for 4 REs.
subframeoffsetConfig
Parameter: $\delta_{IMR} = 0, 1, \ldots 2(80/T_{CSI-RS,ZP} - 1)$ such that $I_{CSI-RS,IMR} = I_{CSI-RS,ZP} + \delta_{IMR}T_{CSI-RS,ZP}$
For $I_{CSI-RS}$ and $T_{CSI-RS}$ definitions, see TS 36.211 [21, table 6.10.5.3-1].
[EUTRAN is not expected to configure values of $\delta_{IMR}$ greater than $2(80/T_{CSI-RS,ZP} - 1)$]

In yet another exemplary embodiment, the present disclosure recognizes that in the embodiment described above, no restriction is imposed on the resourceConfig, and all the 16 configurations are allowed for IMR. However, the selected values should be one of the CSI-RS configurations which are set to one in the bitmap of the zero power CSI-RS configuration. Accordingly, in this exemplary embodiment, a ZP-CSI-RS configuration may be configured as follows. The IE CSI-RS-ConfigZeroTxPower is the CSI-RS resource configuration that E-UTRAN may be configured on a serving frequency when using transmission mode 10 for rate matching purposes. The CSI-RS-ConfigZeroTxPower information elements may be provided according to Table 7 below:

TABLE 7

```
-- ASN1START
CSI-RS-ConfigZeroTxPower-r11 ::=    CHOICE {
    release                              NULL,
    setup                                SEQUENCE {
        resourceConfigList-r11               BIT STRING (SIZE (16)),
        subframeConfig-r11                   INTEGER (0..154)
    }
}
-- ASN1STOP
```

The CSI-RS-ConfigZeroTxPower descriptions are provided according to Table 8 below.

TABLE 8

CSI-RS-ConfigZeroTxPower field descriptions resourceConfig
Parameter: CSI reference signal configuration, see TS 36.211 [21, table 6.10.5.2-1 and 6.10.5.2-2].
subframeConfig
Parameter: $I_{CSI-RS}$, see TS 36.211 [21, table 6.10.5.3-1].

With the above configuration for ZP-CSI-RS configuration (or a similar configuration), the IMR configuration may be defined as follows. The IE IMR-Config is the Interference Measurement Resource (IMR) configuration that E-UTRAN may configure on a serving frequency. The IMR-Config information elements may be provided according to Table 9 below:

TABLE 9

```
-- ASN1START
IMR-Config-r11::=            SEQUENCE {
    imr-Identity-r11             IMR-Identity-r11,
    resourceConfig-r11           INTEGER (0..15),
    subframeConfig-r11           INTEGER (0..30)
    ...
}
-- ASN1STOP
```

The IMR-Config field descriptions are provided according to Table 10 below.

TABLE 10

IMR-Config field descriptions resourceConfig
Parameter: IMR configuration, see TS 36.211 [21, table 6.10.5.2-1 and 6.10.5.2-2] for 4 REs. where to be considered valid index resourceConfig-r11 must take only those values that have the corresponding bit index in parameter resourceConfigList of CSI-RS-ConfigZeroTxPower is set to one.
subframeConfig
Parameter: $\delta_{IMR} = 0, 1, \ldots 2(80/T_{CSI-RS,ZP} - 1)$ such that $I_{CSI-RS,IMR} = I_{CSI-RS,ZP} + \delta_{IMR} T_{CSI-RS,ZP}$
For $I_{CSI-RS}$ and $T_{CSI-RS}$ definitions, see TS 36.211 [21, table 6.10.5.3-1].

In yet another exemplary embodiment, the present disclosure provides an IMR configuration, where the interpretation of the IMR resource configuration field is modified based on the zero power CSI-RS configuration. The IE IMR-Config is the Interference Measurement Resource (IMR) configuration that E-UTRAN may be configured on a serving frequency. The IMR-Config information elements may be provided according to Table 11 below.

TABLE 11

```
-- ASN1START
IMR-Config-r11 ::=            SEQUENCE {
    imr-Identity-r11              IMR-Identity-r11,
    relresourceConfig-r11         INTEGER (0..15),
    subframeConfig-r11            INTEGER (0..30)
    ...
}
-- ASN1STOP
```

The IMR-Config field descriptions are provided according to Table 12 below.

TABLE 12

IMR-Config field descriptions resourceConfig
Parameter: IMR configuration, see TS 36.211 [21, table 6.10.5.2-1 and 6.10.5.2-2] for 4 REs, where index relresourceConfig-r11 is an index which has valid range in [1, ... N], where N is the number of ones in the parameter resourceConfigList of CSI-RS-ConfigZeroTxPower, i.e., number of configured CSI-RS resources. The resourceConfig-r11 is given by the index in the bitmap resourceConfigList which corresponds to the index of a configured CSI-RS resource indicated by relresourceConfig-r11.
subframeConfig
Parameter: $\delta_{IMR} = 0, 1, \ldots 2(80/T_{CSI-RS,ZP} - 1)$ such that $I_{CSI-RS,IMR} = I_{CSI-RS,ZP} + \delta_{IMR} T_{CSI-RS,ZP}$
For $I_{CSI-RS}$ and $T_{CSI-RS}$ definitions, see TS 36.211 [21, table 6.10.5.3-1]

As provided below, the present disclosure provides several examples of defining the relationship between subframeconfig $I_{CSI-RS,ZP}$ of zero power CSI-RS configuration and subframeconfig $I_{CSI-RS,IMR}$ of an IMR configuration.

In one illustrative embodiment, mapping of $\delta_{IMR}$ to $I_{CSI-RS,IMR}$ may be provided according to Table 13 below.

TABLE 13

| CSI-RS-SubframeConfig $I_{CSI-RS,ZP}$ | CSI-RS periodicity $T_{CSI-RS,ZP}$ (subframes) | CSI-RS subframe offset $\Delta_{CSI-RS,ZP}$ (subframes) | CSI-RS-SubframeConfig $I_{CSI-RS,IMR}$ for IMR |
|---|---|---|---|
| 0-4 | 5 | $I_{CSI-RS,ZP}$ | $I_{CSI-RS,ZP} + 5\delta$, $\delta = 0, 1, \ldots 30$ |
| 5-14 | 10 | $I_{CSI-RS,ZP} - 5$ | $I_{CSI-RS,ZP} + 10\delta$, $\delta = 0, 1, \ldots 14$ |
| 15-34 | 20 | $I_{CSI-RS,ZP} - 15$ | $I_{CSI-RS,ZP} + 20\delta$, $\delta = 0, 1, \ldots 6$ |
| 35-74 | 40 | $I_{CSI-RS,ZP} - 35$ | $I_{CSI-RS,ZP} + 40\delta$, $\delta = 0, 1, 2$ |
| 75-154 | 80 | $I_{CSI-RS,ZP} - 75$ | $I_{CSI-RS,ZP}$ |

In another illustrative embodiment, mapping of $\delta_{IMR}$ to $I_{CSI-RS,IMR}$ may be provided according to Table 14 below.

TABLE 14

| $\delta_{IMR}$ | $T_{CSI-RS,ZP} = 5$ | $T_{CSI-RS,ZP} = 10$ | $T_{CSI-RS,ZP} = 20$ | $T_{CSI-RS,ZP} = 40$ | $T_{CSI-RS,ZP} = 80$ |
|---|---|---|---|---|---|
| 0 | $I_{CSI-RS,ZP} + 5\delta$ | $I_{CSI-RS,ZP} + 10\delta$ | $I_{CSI-RS,ZP} + 20\delta$ | $I_{CSI-RS,ZP} + 40\delta$ | $I_{CSI-RS,ZP}$ |
| 1-2 | $I_{CSI-RS,ZP} + 5\delta$ | $I_{CSI-RS,ZP} + 10\delta$ | $I_{CSI-RS,ZP} + 20\delta$ | $I_{CSI-RS,ZP} + 40\delta$ | n/a |
| 3-6 | $I_{CSI-RS,ZP} + 5\delta$ | $I_{CSI-RS,ZP} + 10\delta$ | $I_{CSI-RS,ZP} + 20\delta$ | n/a | n/a |
| 7-14 | $I_{CSI-RS,ZP} + 5\delta$ | $I_{CSI-RS,ZP} + 10\delta$ | n/a | n/a | n/a |
| 15-30 | $I_{CSI-RS,ZP} + 5\delta$ | n/a | n/a | n/a | n/a |

In yet another illustrative embodiment, mapping of $\delta_{IMR}$ to $I_{CSI-RS,IMR}$ may be provided according to Table 15 below.

TABLE 15

| $\delta_{IMR}$ | $I_{CSI-RS,ZP} = 0-4$ | $I_{CSI-RS,ZP} = 5-14$ | $I_{CSI-RS,ZP} = 15-34$ | $I_{CSI-RS,ZP} = 35-74$ | $I_{CSI-RS,ZP} = 75-154$ |
|---|---|---|---|---|---|
| 0 | $I_{CSI-RS,ZP}$ | $I_{CSI-RS,ZP}$ | $I_{CSI-RS,ZP}$ | $I_{CSI-RS,ZP}$ | $I_{CSI-RS,ZP}$ |
| 1-2 | $I_{CSI-RS,ZP} + 5\delta$ | $I_{CSI-RS,ZP} + 10\delta$ | $I_{CSI-RS,ZP} + 20\delta$ | $I_{CSI-RS,ZP} + 40\delta$ | n/a |
| 3-6 | $I_{CSI-RS,ZP} + 5\delta$ | $I_{CSI-RS,ZP} + 10\delta$ | $I_{CSI-RS,ZP} + 20\delta$ | n/a | n/a |
| 7-14 | $I_{CSI-RS,ZP} + 5\delta$ | $I_{CSI-RS,ZP} + 10\delta$ | n/a | n/a | n/a |
| 15-30 | $I_{CSI-RS,ZP} + 5\delta$ | n/a | n/a | n/a | n/a |

In yet another illustrative embodiment, mapping of $\delta_{IMR}$ to $I_{CSI-RS,IMR}$ may be provided according to Table 16 below.

TABLE 16

| $\delta_{IMR}$ | $I_{CSI-RS,ZP}$ = 0-4 | $I_{CSI-RS,ZP}$ = 5-14 | $I_{CSI-RS,ZP}$ = 15-34 | $I_{CSI-RS,ZP}$ = 35-74 | $I_{CSI-RS,ZP}$ = 75-154 |
|---|---|---|---|---|---|
| 0 | $I_{CSI-RS,ZP}$ | $I_{CSI-RS,ZP}$ | $I_{CSI-RS,ZP}$ | $I_{CSI-RS,ZP}$ | $I_{CSI-RS,ZP}$ |
| 1 | $I_{CSI-RS,ZP}$ + 5 | $I_{CSI-RS,ZP}$ + 10 | $I_{CSI-RS,ZP}$ + 20 | $I_{CSI-RS,ZP}$ + 40 | n/a |
| 2 | $I_{CSI-RS,ZP}$ + 10 | $I_{CSI-RS,ZP}$ + 20 | $I_{CSI-RS,ZP}$ + 40 | $I_{CSI-RS,ZP}$ + 80 | n/a |
| 3 | $I_{CSI-RS,ZP}$ + 15 | $I_{CSI-RS,ZP}$ + 30 | $I_{CSI-RS,ZP}$ + 60 | n/a | n/a |
| 4 | $I_{CSI-RS,ZP}$ + 20 | $I_{CSI-RS,ZP}$ + 40 | $I_{CSI-RS,ZP}$ + 80 | n/a | n/a |
| 5 | $I_{CSI-RS,ZP}$ + 25 | $I_{CSI-RS,ZP}$ + 50 | $I_{CSI-RS,ZP}$ + 100 | n/a | n/a |
| 6 | $I_{CSI-RS,ZP}$ + 30 | $I_{CSI-RS,ZP}$ + 60 | $I_{CSI-RS,ZP}$ + 120 | n/a | n/a |
| 7 | $I_{CSI-RS,ZP}$ + 35 | $I_{CSI-RS,ZP}$ + 70 | n/a | n/a | n/a |
| 8 | $I_{CSI-RS,ZP}$ + 40 | $I_{CSI-RS,ZP}$ + 80 | n/a | n/a | n/a |
| 9 | $I_{CSI-RS,ZP}$ + 45 | $I_{CSI-RS,ZP}$ + 90 | n/a | n/a | n/a |
| 10 | $I_{CSI-RS,ZP}$ + 50 | $I_{CSI-RS,ZP}$ + 100 | n/a | n/a | n/a |
| 11 | $I_{CSI-RS,ZP}$ + 55 | $I_{CSI-RS,ZP}$ + 110 | n/a | n/a | n/a |
| 12 | $I_{CSI-RS,ZP}$ + 60 | $I_{CSI-RS,ZP}$ + 120 | n/a | n/a | n/a |
| 13 | $I_{CSI-RS,ZP}$ + 65 | $I_{CSI-RS,ZP}$ + 130 | n/a | n/a | n/a |
| 14 | $I_{CSI-RS,ZP}$ + 70 | $I_{CSI-RS,ZP}$ + 140 | n/a | n/a | n/a |
| 15 | $I_{CSI-RS,ZP}$ + 75 | n/a | n/a | n/a | n/a |
| 16 | $I_{CSI-RS,ZP}$ + 80 | n/a | n/a | n/a | n/a |
| 17 | $I_{CSI-RS,ZP}$ + 85 | n/a | n/a | n/a | n/a |
| 18 | $I_{CSI-RS,ZP}$ + 90 | n/a | n/a | n/a | n/a |
| 19 | $I_{CSI-RS,ZP}$ + 95 | n/a | n/a | n/a | n/a |
| 20 | $I_{CSI-RS,ZP}$ + 100 | n/a | n/a | n/a | n/a |
| 21 | $I_{CSI-RS,ZP}$ + 105 | n/a | n/a | n/a | n/a |
| 22 | $I_{CSI-RS,ZP}$ + 110 | n/a | n/a | n/a | n/a |
| 23 | $I_{CSI-RS,ZP}$ + 115 | n/a | n/a | n/a | n/a |
| 24 | $I_{CSI-RS,ZP}$ + 120 | n/a | n/a | n/a | n/a |
| 25 | $I_{CSI-RS,ZP}$ + 125 | n/a | n/a | n/a | n/a |
| 26 | $I_{CSI-RS,ZP}$ + 130 | n/a | n/a | n/a | n/a |
| 27 | $I_{CSI-RS,ZP}$ + 135 | n/a | n/a | n/a | n/a |
| 28 | $I_{CSI-RS,ZP}$ + 140 | n/a | n/a | n/a | n/a |
| 29 | $I_{CSI-RS,ZP}$ + 145 | n/a | n/a | n/a | n/a |
| 30 | $I_{CSI-RS,ZP}$ + 150 | n/a | n/a | n/a | n/a |

In these embodiments, the relationship between $\delta_{IMR}$ and $I_{CSI-RS,IMR}$ may be represented according to Equation 4 below:

$$I_{CSI-RS,IMR} = I_{CSI-RS,ZP} + \Delta I_{IMR} \quad \text{(Equation 4)}$$

where $\Delta I_{IMR}$ below is based on the higher layer signaled parameter $\delta_{IMR}$ and $I_{CSI-RS,ZP}$.

In yet another illustrative embodiment, mapping of $\delta_{IMR}$ to $\Delta I_{IMR}$ may be provided according to Table 17 below.

TABLE 17

| $\delta_{IMR}$ | $I_{CSI-RS,ZP}$ = 0-4 | $I_{CSI-RS,ZP}$ = 5-14 | $I_{CSI-RS,ZP}$ = 15-34 | $I_{CSI-RS,ZP}$ = 35-74 | $I_{CSI-RS,ZP}$ = 75-154 |
|---|---|---|---|---|---|
| 0 | 0 | 0 | 0 | 0 | 0 |
| 1-2 | 5δ | 10δ | 20δ | 40δ | n/a |
| 3-6 | 5δ | 10δ | 20δ | n/a | n/a |
| 7-14 | 5δ | 10δ | n/a | n/a | n/a |
| 15-30 | 5δ | n/a | n/a | n/a | n/a |

In yet another illustrative embodiment, mapping of $\delta_{IMR}$ to $\Delta I_{IMR}$ may be provided according to Table 18 below.

TABLE 18

| $\delta_{IMR}$ | $I_{CSI-RS,ZP}$ = 0-4 | $I_{CSI-RS,ZP}$ = 5-14 | $I_{CSI-RS,ZP}$ = 15-34 | $I_{CSI-RS,ZP}$ = 35-74 | $I_{CSI-RS,ZP}$ = 75-154 |
|---|---|---|---|---|---|
| 0 | 0 | 0 | 0 | 0 | 0 |
| 1 | 5 | 10 | 20 | 40 | n/a |
| 2 | 10 | 20 | 40 | 80 | n/a |
| 3 | 15 | 30 | 60 | n/a | n/a |
| 4 | 20 | 40 | 80 | n/a | n/a |
| 5 | 25 | 50 | 100 | n/a | n/a |
| 6 | 30 | 60 | 120 | n/a | n/a |
| 7 | 35 | 70 | n/a | n/a | n/a |

TABLE 18-continued

| $\delta_{IMR}$ | $I_{CSI-RS,ZP}$ = 0-4 | $I_{CSI-RS,ZP}$ = 5-14 | $I_{CSI-RS,ZP}$ = 15-34 | $I_{CSI-RS,ZP}$ = 35-74 | $I_{CSI-RS,ZP}$ = 75-154 |
|---|---|---|---|---|---|
| 8 | 40 | 80 | n/a | n/a | n/a |
| 9 | 45 | 90 | n/a | n/a | n/a |
| 10 | 50 | 100 | n/a | n/a | n/a |
| 11 | 55 | 110 | n/a | n/a | n/a |
| 12 | 60 | 120 | n/a | n/a | n/a |
| 13 | 65 | 130 | n/a | n/a | n/a |
| 14 | 70 | 140 | n/a | n/a | n/a |
| 15 | 75 | n/a | n/a | n/a | n/a |
| 16 | 80 | n/a | n/a | n/a | n/a |
| 17 | 85 | n/a | n/a | n/a | n/a |
| 18 | 90 | n/a | n/a | n/a | n/a |
| 19 | 95 | n/a | n/a | n/a | n/a |
| 20 | 100 | n/a | n/a | n/a | n/a |
| 21 | 105 | n/a | n/a | n/a | n/a |
| 22 | 110 | n/a | n/a | n/a | n/a |
| 23 | 115 | n/a | n/a | n/a | n/a |
| 24 | 120 | n/a | n/a | n/a | n/a |
| 25 | 125 | n/a | n/a | n/a | n/a |
| 26 | 130 | n/a | n/a | n/a | n/a |
| 27 | 135 | n/a | n/a | n/a | n/a |
| 28 | 140 | n/a | n/a | n/a | n/a |
| 29 | 145 | n/a | n/a | n/a | n/a |
| 30 | 150 | n/a | n/a | n/a | n/a |

In another embodiment, the parameter relative subframe config $i_{CSI-RS,IMR}$ (i.e., the same as $\delta_{IMR}$ used in the previous embodiments) is defined as part of the IMR configuration which directly maps to the IMR subframe configuration. Table 19 below illustrates the mapping from the pair ($I_{CSI-RS,ZP}$, $i_{CSI-RS,IMR}$) to the IMR subframe configuration parameters.

TABLE 19

| CSI-RS-SubframeConfig $I_{CSI-RS,ZP}$ | IMR-RelSubframeConfig $i_{CSI-RS,IMR}$ | IMR periodicity $T_{CSI-RS,IMR}$ (subframes) | IMR subframe offset $\Delta_{CSI-RS,IMR}$ (subframes) |
|---|---|---|---|
| 0-154 | 0 | $T_{CSI-RS,ZP}$ | $\Delta_{CSI-RS,ZP} + (i_{CSI-RS,IMR})T_{CSI-RS,ZP}$ |
| 0-74 | 1-2 | $2T_{CSI-RS,ZP}$ | $\Delta_{CSI-RS,ZP} + (i_{CSI-RS,IMR} - 1)T_{CSI-RS,ZP}$ |
| 0-34 | 3-6 | $4T_{CSI-RS,ZP}$ | $\Delta_{CSI-RS,ZP} + (i_{CSI-RS,IMR} - 3)T_{CSI-RS,ZP}$ |
| 0-14 | 7-14 | $8T_{CSI-RS,ZP}$ | $\Delta_{CSI-RS,ZP} + (i_{CSI-RS,IMR} - 7)T_{CSI-RS,ZP}$ |
| 0-4 | 15-30 | $16T_{CSI-RS,ZP}$ | $\Delta_{CSI-RS,ZP} + (i_{CSI-RS,IMR} - 15)T_{CSI-RS,ZP}$ |

As provided above, not all the values of $i_{CSI-RS,IMR}$ can be used with each $I_{CSI-RS,ZP}$. For example, for $I_{CSI-RS,ZP}$ in [0 4], all the values of $i_{CSI-RS,IMR}$ (0-30) can be used, while for $I_{CSI-RS,ZP}$ in [15-34], only the values of $i_{CSI-RS,IMR}$ as represented in the first three columns (i.e., [0-6]) can be considered valid.

Subframes containing IMR reference signals for an IMR configuration as above satisfy, $(10n_f + \lfloor n_s/2 \rfloor - \Delta_{CSI-RS,IMR})$ mod $T_{CSI-RS,IMR} = 0$. Also, $I_{CSI-RS,ZP}$, $T_{CSI-RS,ZP}$, $\Delta_{CSI-RS,ZP}$ are the subframe configuration, associated periodicity, and the subframe offset, respectively, of a Release-10 CSI configuration or a similarly defined Release-11 ZP-CSI-RS configuration.

The IE IMR-Config is the Interference Measurement Resource (IMR) configuration that E-UTRAN may be configured on a serving frequency. The IMR-Config information elements may be provided according to Table 20 below.

TABLE 20

```
-- ASN1START
IMR-Config-r11 ::=   SEQUENCE {
    imr-Identity-r11         IMR-Identity-r11,
    resourceConfig-r11       INTEGER (0..15),
    relsubframeConfig-r11    INTEGER (0..30)    --
Coding/ value range is FFS
    ...
}
-- ASN1STOP
```

The IMR-Config field descriptions are provided according to Table 21 below.

TABLE 21

IMR-Config field descriptions resourceConfig
Parameter: IMR configuration, see TS 36.211 [21, table 6.10.5.2-1 and 6.10.5.2-2] for 4 REs.
relsubframeConfig
Parameter: $i_{CSI-RS,IMR}$, see TS 36-211 [21, table 6.10.5.3-1].
[EUTRAN is not expected to configure values of $i_{CSI-RS,IMR}$ not compatible with $I_{CSI-RS,ZP}$, where the compatible range of values can be obtained from the table]

In these embodiments, the IMR may be configured only if a ZP-CSI-RS configuration is also configured. In one example, if the IMR is not configured, interference measurements at the UE are based on CRS.

In another exemplary embodiment, a Release-10 CSI-RS configuration or a zero-power CSI-RS configuration may not be configured. In this case, since $I_{CSI-RS,ZP}$ is not available, the network can indicate a single value of $I_{CSI-RS,IMRtot}$ for configuring IMR that represents the subframe configuration corresponding to the total set of IMR configurations. This parameter may be used similarly in place of $I_{CSI-RS,ZP}$ for subframe configurations of individual IMRs. An example modifying the embodiment described above with this approach is illustrated by Table 22 below. Table 22 illustrates a mapping of relsubframeConfig $i_{CSI-RS,IMR}$ to IMR subframe configuration.

TABLE 22

| CSI-RS-SubframeConfig $I_{CSI-RS,IMRtot}$ | IMR-RelSubframeConfig $i_{CSI-RS,IMR}$ | IMR periodicity $T_{CSI-RS,IMR}$ (subframes) | IMR subframe offset $\Delta_{CSI-RS,IMR}$ (subframes) |
|---|---|---|---|
| 0-154 | 0 | $T_{CSI-RS,IMRtot}$ | $\Delta_{CSI-RS,IMRtot} + (i_{CSI-RS,IMR})T_{CSI-RS,IMRtot}$ |
| 0-74 | 1-2 | $2T_{CSI-RS,IMRtot}$ | $\Delta_{CSI-RS,IMRtot} + (i_{CSI-RS,IMR} - 1)T_{CSI-RS,IMRtot}$ |
| 0-34 | 3-6 | $4T_{CSI-RS,IMRtot}$ | $\Delta_{CSI-RS,IMRtot} + (i_{CSI-RS,IMR} - 3)T_{CSI-RS,IMRtot}$ |
| 0-14 | 7-14 | $8T_{CSI-RS,IMRtot}$ | $\Delta_{CSI-RS,IMRtot} + (i_{CSI-RS,IMR} - 7)T_{CSI-RS,IMRtot}$ |
| 0-4 | 15-30 | $16T_{CSI-RS,IMRtot}$ | $\Delta_{CSI-RS,IMRtot} + (i_{CSI-RS,IMR} - 15)T_{CSI-RS,IMRtot}$ |

In other embodiments, this same modification may be used for any of the other embodiments described above by replacing $I_{CSI-RS,ZP}$ with $I_{CSI-RS,IMRtot}$ and then using the corresponding mappings for subframe configurations of IMR.

In accordance with various embodiments of the present disclosure, with CoMP across a set of transmission points, an IMR configuration corresponds to a particular interference hypothesis reflecting interference from some of the transmission points while other transmission points may be muted (e.g., no transmission). Each TP may have an obligation to mute on different sets of IMR REs corresponding to the UEs in the network. For transmission of PDSCH data, if dynamic point selection is used, a UE may receive transmissions from different TPs at different times. This implies a different PDSCH rate matching pattern depending on the selected TP or TPs for transmission.

Embodiments of the present disclosure provide that the PDSCH muting pattern be signaled dynamically using a downlink control format that is used for downlink grant. Since IMR REs can also be expressed as a zero-power CSI-RS (ZP-CSI-RS) configuration, embodiments of the present disclosure provide to configure two or more ZP-CSI-RS configurations by higher layer signaling and select between them dynamically. For the new transmission mode defined in Release-11 (i.e., transmission mode 10), a modified DCI format 2D/2C is provided for this purpose.

In various embodiments, the present disclosure provides a first set of ZP-CSI-RS configuration or configurations to be used are configured by higher layers for a first DCI Format type, and a second set of ZP-CSI-RS configuration or configurations to be used are configured by higher layers for a second DCI Format type. In one embodiment, the present disclosure provides that a first set of ZP-CSI-RS configuration or configurations to be used are configured by higher layers for DCI Format 1A, and that a second set of ZP-CSI-RS configuration or configurations to be used are configured by higher layers for DCI Format 2C (and/or DCI Format 2D).

On the other hand, DCI Format 1A is used for fallback transmission to a UE, and dynamic signaling is not desired to avoid increasing the payload of the DCI Format. For DCI Format 1A, in various embodiments, the present disclosure provides to support a ZP-CSI-RS configuration or configurations and not to support dynamic signaling of this configuration. The fallback based on DCI Format 1A could be based on either Port 7 DMRS (e.g., single port transmission scheme) or CRS (e.g., using transmit diversity transmission scheme). In CoMP scenario 4, common reference signals (e.g., CRS) are likely to be SFN transmitted from multiple TPs for coverage, while port 7 is likely transmitted from a single TP for cell splitting gains.

Accordingly, in various embodiments, the present disclosure provides at least two ZP-CSI-RS configurations are configured for the PDSCH rate matching with DCI Format 1A. These two ZP-CSI-RS configurations may represent a ZP CSI-RS configuration that represents a super set of muting for all TPs and/or a ZP CSI-RS configuration that represents a single serving TP. However, no dynamic signaling is required between these configurations.

In one embodiment, the ZP-CSI-RS to be applied for rate matching of PDSCH corresponding to DCI Format 1A is implicitly selected between the at least two ZP-CSI-RS based on the PDSCH transmission scheme. In another embodiment, the ZP-CSI-RS to be applied for rate matching of PDSCH corresponding to DCI Format 1A is selected between the at least two ZP-CSI-RS based on the PDSCH transmission port. In yet another embodiment, the ZP-CSI-RS to be applied for rate matching of PDSCH corresponding to DCI Format 1A is selected between the at least two ZP-CSI-RS based on the subframe type, namely one of MBSFN subframe or the non-MBSFN subframe.

In yet another embodiment, the ZP-CSI-RS to be applied for rate matching of PDSCH corresponding to DCI Format 1A is selected between the at least two ZP-CSI-RS based on the search space type of the control channel, namely the UE specific search space (UESS) or common search space (CSS). In yet another embodiment, the ZP-CSI-RS to be applied for rate matching of PDSCH corresponding to DCI Format 1A is selected between the at least two ZP-CSI-RS based on the type of the control channel, namely enhanced PDCCH (ePDCCH transmitted on DMRS) or the legacy PDCCH (transmitted on CRS). In yet another embodiment, the ZP-CSI-RS to be applied for rate matching of PDSCH corresponding to DCI Format 1A is selected between the at least two ZP-CSI-RS based on one or more of transmission port, transmission scheme, control channel type, and control channel search space type.

In yet another embodiment, a first higher layer configured ZP-CSI-RS configuration is applied for rate matching of PDSCH corresponding to DCI Format 1A for Port 7 DMRS based single port transmission scheme, and a second higher layer configured ZP-CSI-RS configuration is applied for rate matching of PDSCH corresponding to DCI Format 1A for CRS based transmit diversity.

In various embodiments, the zero-power CSI-RS configuration applicable can be based on one of the higher layer configured zero-power CSI-RS configurations configured for DCI Format 2C/D. In one example, a two-bit indicator in DCI Format 2C/D may be provided as illustrated in Table 23 below.

TABLE 23

| Bit field | CRS position | Starting position | ZP CSI-RS | Co-location |
|---|---|---|---|---|
| 00 | $1^{st}$ RRC-CRS | $1^{st}$ RRC-starting | $1^{st}$ RRC-ZP | $1^{st}$ RRC-CO |
| 01 | $2^{nd}$ RRC-CRS | $2^{nd}$ RRC-starting | $2^{nd}$ RRC-ZP | $2^{nd}$ RRC-CO |
| 10 | $3^{rd}$ RRC-CRS | $3^{rd}$ RRC-starting | $3^{rd}$ RRC-ZP | $3^{rd}$ RRC-CO |
| 11 | $4^{th}$ RRC-CRS | $4^{th}$ RRC-starting | $4^{th}$ RRC-ZP | $4^{th}$ RRC-CO |

As illustrated in Table 23 above, the bit field indicates overall the PDSCH rate matching information and the quasi-colocation (QCL) information. The PDSCH rate matching information is conveyed by a CRS position, a PDSCH starting position, and a ZP-CSI-RS configuration. The quasi-colocation information conveys to the UE which of the configured non-zero-power CSI-RS may be assumed to be quasi co-located with the DMRS port of the assigned PDSCH. Quasi-colocation assumption implies that the corresponding CSI-RS and the DMRS of PDSCH can be assumed to share some channel statistics related properties like Delay spread, Doppler spread, frequency shift, timing, etc. In one example, the ZP-CSI-RS configuration is explicitly indicated by higher layers as corresponding to one of the values of the bit field, for example, '00'. In another example, the zero power CSI-RS configuration is implicitly defined as corresponding to one of the values of the bit field. In one method, it is the lowest value of bit field (e.g., '00').

Various embodiments of the present disclosure provide covering all IMRs configured for a UE with a single ZP-CSI-RS configuration. Embodiments of the present disclosure provide options on how such a single ZP-CSI-RS configuration is related to the dynamically configured ZP CSI-RS configurations for DCI Format 2D/C or the default configuration used for DCI Format 1A. In one illustrative embodiment, one of the higher layer configured ZP-CSI-RS configurations is used to cover all IMRs configured for a UE. It is further signaled which of the higher layer configured ZP-CSI-RS configurations cover all IMRs.

In another illustrative embodiment, the first default higher layer configured ZP-CSI-RS configuration is used to cover all IMRs configured for a UE. This embodiment may be preferable, since a default ZP CSI-RS configuration can be configured to include all the ZP CSI-RS configurations corresponding to the DCI Format 2D/C. Also, as discussed above, one of the two default ZP-CSI-RS configurations corresponds to SFN transmission from all TPs, and hence, the ZP-CSI-RS configurations used by DCI Format 2D/C are a subset of this configuration.

In one illustrative embodiment, all the IMR configurations are covered by a default ZP-CSI-RS configuration, the default ZP-CSI-RS being one of the ZP-CSI-RS configurations used for DCI Format 1A. In another illustrative embodiment, all the IMR configurations are covered by a default ZP-CSI-RS configuration, the default ZP-CSI-RS being one of the ZP-CSI-RS configurations used for DCI Format 2C or 2D.

In various embodiments, the current subframe-config definition may be provided as illustrated in Table 24 below.

TABLE 24

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |

TABLE 24-continued

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 35-74 | 40 | $I_{CSI-RS} - 35$ |
| 75-154 | 80 | $I_{CSI-RS} - 75$ |

In one example, the subframe configuration of individual IMR is obtained as follows from a single configured subframe-config $I_o$ that corresponds to a default zero power CSI-RS configuration, for example, according to Equation 5 below:

$$I_{CSI-RS,IMR} = I_o + iT_o, i=0,1,\ldots 2(T_{max}/T_o - 1) \quad \text{(Equation 5)}$$

where $T_{max}$ is the maximum periodicity of CSI-RS, which is equal to 80, and $T_o$ is the period associated with $I_o$. $I_{CSI-RS,IMR}$ and $I_o$ are interpreted the same way as $I_{CSI-RS}$ in Table 23 above.

Figure 10:
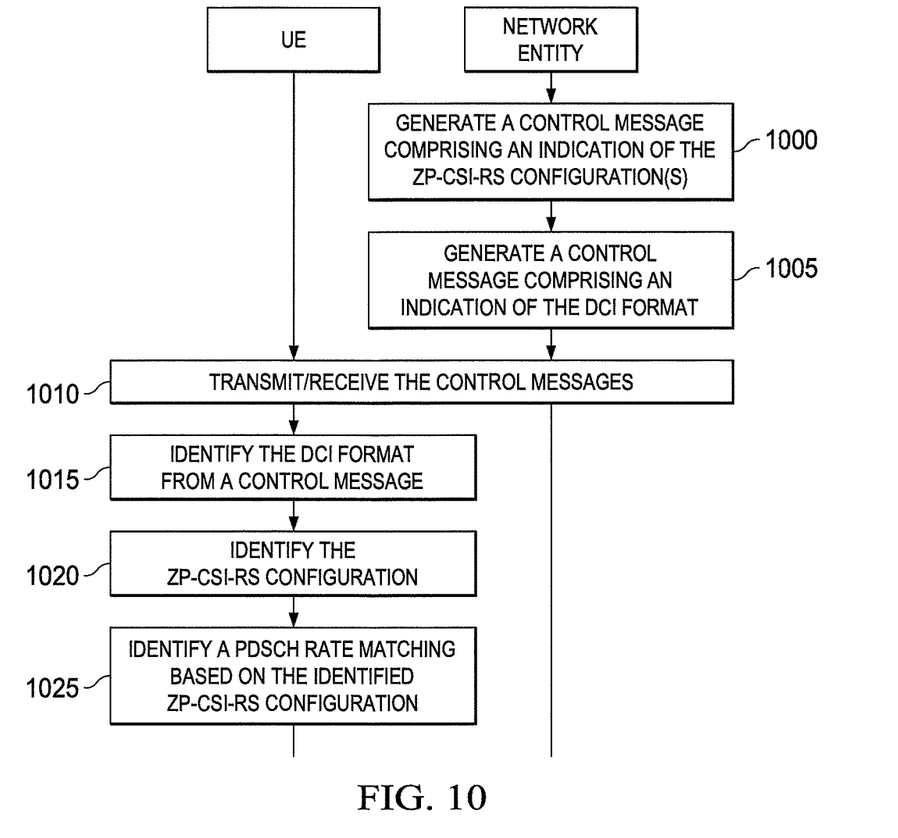
FIG. 10 illustrates a flowchart of a process for indicating and identifying a ZP-CSI-RS configuration in a wireless network in accordance with various embodiments of the present disclosure.

FIG. 10 illustrates a flowchart of a process for indicating and identifying a ZP-CSI-RS configuration in a wireless network in accordance with various embodiments of the present disclosure. For example, the process depicted in FIG. 10 may be performed by the UE 505 and a network entity, such as TPs 510 or 515 or network 520 in FIG. 5. The process may also be implemented by the base station 102 and the UE 116 in FIG. 1.

The process begins with the network generating a control message comprising an indication the ZP-CSI-RS configuration or configurations (step 1000). For example, the network may provide higher layer signaling of the ZP-CSI-RS configuration or configurations. In one example, the higher layer signaling may provide a mapping of bit field values to the ZP-CSI-RS configuration or configurations, for example, as illustrated in Table 23. In one example, the indication of the ZP-CSI-RS configuration for PDSCH rate matching is explicitly indicated in a ZP-CSI-RS configuration type field in the control message. In other examples, the ZP-CSI-RS configuration for PDSCH rate mapping may be implicitly indicated as being able to be inferred from another field or transmission parameters depending on the DCI format. In this example, the network configures a first set of ZP-CSI-RS configuration or configurations to be used for DCI Format 1A and a second set of ZP-CSI-RS configuration or configurations are configured to be used for DCI Format 2D or 2C.

The network generates a control message comprising an indication of the DCI format (step 1005). For example, in step 1005, this control message may be a dynamic signaling of DL assignment by DCI. Thereafter, the network transmits and the UE receives the control messages (step 1010). For example, the higher layer signaling control message and the dynamic signaling control message may be generated and/or transmitted by the network at different times. The UE then identifies the DCI format from a control message (step 1015). For example, in step 1015, the UE may identify the DCI format is DCI format 1A or DCI Format 2D from the control message.

The UE then identifies the ZP-CSI-RS configuration (step 1020). For example, in step 1020, if the DCI format is DCI Format 2D or 2C, the UE may identify which ZP-CSI-RS configuration of the second set to use for PDSCH rate matching from an explicit indication of the configuration in the control message. In another example, if the DCI format is DCI format 1A, the UE may determine to use a first ZP-CSI-RS configuration from the first set for PDSCH rate matching when PDSCH transmission is on antenna port 7 and to use a second ZP-CSI-RS configuration from the first set for PDSCH rate matching when the identified DCI Format is DCI Format 1A and PDSCH transmission is on one or more CRS antenna ports. In this example, PDSCH transmission on antenna port 7 may be based on a single port transmission scheme, while PDSCH transmission on the one or more CRS antenna ports may be based on a transmit diversity transmission scheme or a single port transmission scheme. In this example, the UE may identify the ZP-CSI-RS configuration from an implicit indication based on one of the values of a bit field in the control message. In one example, the UE uses the lowest value of bit field (e.g., '00').

Thereafter, the UE identifies the PDSCH rate matching based on the identified ZP-CSI-RS configuration (step 1025). For example, in step 1025, depending on the DCI format type and antenna port used for PDSCH, UE decides the ZP-CSI-RS to be rate matched around for PDSCH decoding. The UE may use the identified ZP-CSI-RS configuration to identify a rate at which IMR REs are present in the PDSCH transmission. The UE may also identify which REs in the PDSCH transmission are zero power and are not required to be decoded.

Although FIG. 10 illustrates an example process for indicating and identifying a ZP-CSI-RS configuration in a wireless network in accordance with various embodiments of the present disclosure, various changes could be made to FIG. 10. For example, while shown as a series of steps, various steps in each figure could overlap, occur in parallel, occur in a different order, or occur multiple times.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a terminal for decoding a physical downlink shared channel (PDSCH) in a wireless communication system, the method comprising:
    identifying a plurality of configurations for zero power channel state information reference signal (ZP-CSI-RS);
    decoding a PDSCH with a first configuration for ZP-CSI-RS from the plurality of configurations, in case that the PDSCH is associated with a downlink control information (DCI) format 1A for a PDSCH transmission on an antenna port 7, wherein the PDSCH associated with the DCI format 1A is not mapped to at least one resource element identified by the first configuration for ZP-CSI-RS; and
    decoding, in case that the PDSCH is associated with a DCI format 2D, the PDSCH with a second configuration for ZP-CSI-RS which is indicated by 2 bits in the DCI format 2D, the second configuration for ZP-CSI-RS being one of the plurality of configurations for ZP-CSI-RS, wherein the second configuration for ZP-CSI-RS includes ZP-CSI-RS information, PDSCH start information, and quasi co-location information, and wherein the PDSCH associated with the DCI format 2D is not mapped to at least one resource element identified by the one configuration for ZP-CSI-RS.

2. The method of claim 1, wherein, in case that the terminal is configured with a transmission mode 10 and the PDSCH is associated with the DCI format 1A, the PDSCH is decoded with the first configuration for ZP-CSI-RS.

3. The method of claim 1, wherein the ZP-CSI-RS information includes information on a starting symbol for each of the one or more ZP-CSI-RS resources.

4. The method of claim 1, wherein the plurality of configurations for ZP-CSI-RS are received by a higher layer signaling, and
wherein the configuration for ZP-CSI-RS further comprises cell specific reference signal (CRS) information.

5. A terminal for decoding a physical downlink shared channel (PDSCH) in a wireless communication system, the terminal comprising:
a transceiver configured to transmit and receive a signal; and
a controller configured to:
identify a plurality of configurations for zero power channel state information reference signal (ZP-CSI-RS),
decode a PDSCH with a first configuration for ZP-CSI-RS from the plurality of configurations, in case that the PDSCH is associated with a downlink control information (DCI) format 1A for a PDSCH transmission on an antenna port 7, wherein the PDSCH associated with the DCI format 1A is not mapped to at least one resource element identified by the first configuration for ZP-CSI-RS, and
decode, in case that the PDSCH is associated with a DCI format 2D, the PDSCH with a second configuration for ZP-CSI-RS which is indicated by 2 bits in the DCI format 2D, the second configuration for ZP-CSI-RS being one of the plurality of configurations for ZP-CSI-RS, wherein the second configuration for ZP-CSI-RS includes ZP-CSI-RS information, PDSCH start information, and quasi co-location information, wherein the PDSCH associated with the DCI format 2D is not mapped to at least one resource element identified by the one configuration for ZP-CSI-RS.

6. The terminal of claim 5, wherein the plurality of configurations for ZP-CSI-RS are received by a higher layer signaling, and
wherein the configuration for ZP-CSI-RS further comprises cell specific reference signal (CRS) information.

7. The terminal of claim 5, wherein the ZP-CSI-RS information includes information on a starting symbol for each of the one or more ZP-CSI-RS resources.

8. The terminal of claim 5, wherein, in case that the terminal is configured with a transmission mode 10 and the PDSCH is associated with the DCI format 1A, the PDSCH is decoded with the first configuration for ZP-CSI-RS.

9. A base station for transmitting a physical downlink shared channel (PDSCH) in a wireless communication system, the base station comprising:
a transceiver configured to transmit and receive a signal; and
a controller configured to:
transmit, to a terminal, a control message comprising a plurality of configurations for zero power channel state information reference signal (ZP-CSI-RS),
transmit a PDSCH with a first configuration for ZP-CSI-RS from the plurality of configurations, in case that the PDSCH is associated with a downlink control information (DCI) format 1A for a PDSCH transmission on an antenna port 7, wherein the PDSCH associated with the DCI format 1A is not mapped to at least one resource element identified by the first configuration for ZP-CSI-RS, and
transmit, in case that the PDSCH is associated with a DCI format 2D, the PDSCH with a second configuration for ZP-CSI-RS which is indicated by 2 bits in the DCI format 2D, the second configuration for ZP-CSI-RS being one of the plurality of configurations for ZP-CSI-RS, wherein the second configuration for ZP-CSI-RS includes ZP-CSI-RS information, PDSCH start information, and quasi co-location information, wherein the PDSCH associated with the DCI format 2D is not mapped to at least one resource element identified by the one configuration for ZP-CSI-RS.

10. The base station of claim 9, wherein, in case that the terminal is configured with a transmission mode 10 and the PDSCH is associated with the DCI format 1A, the PDSCH is decoded with the first configuration for ZP-CSI-RS.

11. The base station of claim 9, wherein the ZP-CSI-RS information includes information on a starting symbol for each of the one or more ZP-CSI-RS resources.

12. The base station of claim 9, wherein the plurality of configurations for ZP-CSI-RS are transmitted by a higher layer signaling, and
wherein the configuration for ZP-CSI-RS further comprises cell specific reference signal (CRS) information.

13. A method performed by a base station for transmitting a physical downlink shared channel (PDSCH) in a wireless communication system, the method comprising:
transmitting, to a terminal, a control message comprising a plurality of configurations for zero power channel state information reference signal (ZP-CSI-RS);
transmitting a PDSCH with a first configuration for ZP-CSI-RS from the plurality of configurations, in case that the PDSCH is associated with a downlink control information (DCI) format 1A for a PDSCH transmission on an antenna port 7, wherein the PDSCH associated with the DCI format 1A is not mapped to at least one resource element identified by the first configuration for ZP-CSI-RS; and
transmitting, in case that the PDSCH is associated with a DCI format 2D, the PDSCH with a second configuration for ZP-CSI-RS which is indicated by 2 bits in the DCI format 2D, the second configuration for ZP-CSI-RS being one of the plurality of configurations for ZP-CSI-RS, wherein the second configuration for ZP-CSI-RS includes ZP-CSI-RS information, PDSCH start information, and quasi co-location information, wherein the PDSCH associated with the DCI format 2D is not mapped to at least one resource element identified by the one configuration for ZP-CSI-RS.

14. The method of claim 13, wherein, in case that the terminal is configured with a transmission mode 10 and the PDSCH is associated with the DCI format 1A, the PDSCH is decoded with the first configuration for ZP-CSI-RS.

15. The method of claim 13, wherein the ZP-CSI-RS information includes information on a starting symbol for each of the one or more ZP-CSI-RS resources.

16. The method of claim 13, wherein the plurality of configurations for ZP-CSI-RS are transmitted by a higher layer signaling, and
wherein the configuration for ZP-CSI-RS further comprises cell specific reference signal (CRS) information.

* * * * *